US007954458B2

(12) United States Patent
Bozzuto et al.

(10) Patent No.: US 7,954,458 B2
(45) Date of Patent: Jun. 7, 2011

(54) BOILER HAVING AN INTEGRATED OXYGEN PRODUCING DEVICE

(75) Inventors: Carl R. Bozzuto, Enfield, CT (US); Mark Palkes, Glastonbury, CT (US)

(73) Assignee: Alstom Technology Ltd (CH)

( * ) Notice: Subject to any disclaimer, the term of this patent is extended or adjusted under 35 U.S.C. 154(b) by 634 days.

(21) Appl. No.: 11/939,916

(22) Filed: Nov. 14, 2007

(65) Prior Publication Data
US 2009/0120379 A1 May 14, 2009

(51) Int. Cl.
*B01D 59/12* (2006.01)
(52) U.S. Cl. .................. 122/4 D; 95/54; 96/4
(58) Field of Classification Search ............. 95/54, 45; 122/34, 488, 489, 4 D, 1 A; 60/649; 96/4, 96/8, 10
See application file for complete search history.

(56) References Cited

U.S. PATENT DOCUMENTS

| | | | |
|---|---|---|---|
| 3,590,909 A * | 7/1971 | Butt | 165/108 |
| 3,876,392 A | 4/1975 | Kalina et al. | |
| 4,244,779 A | 1/1981 | Nieminen et al. | |
| 4,498,289 A | 2/1985 | Osgerby | |
| 4,731,099 A | 3/1988 | Ergezinger | |
| 4,745,884 A | 5/1988 | Coulthard | |
| 4,913,097 A | 4/1990 | Derksen et al. | |
| 5,175,995 A | 1/1993 | Pak | |
| 5,335,609 A | 8/1994 | Nelson et al. | |
| 5,339,774 A | 8/1994 | Tang | |
| 5,692,396 A * | 12/1997 | Rathbone | 62/646 |
| 5,908,804 A | 6/1999 | Menon et al. | |
| 6,202,574 B1 | 3/2001 | Liljedahl et al. | |
| 6,382,958 B1 * | 5/2002 | Bool et al. | 431/2 |
| 6,406,518 B1 | 6/2002 | Bonaquist et al. | |
| 6,505,567 B1 | 1/2003 | Anderson et al. | |
| 6,539,719 B2 * | 4/2003 | Prasad et al. | 60/649 |
| 6,562,104 B2 | 5/2003 | Bool, III et al. | |

(Continued)

FOREIGN PATENT DOCUMENTS

DE 19703197 6/1998

(Continued)

OTHER PUBLICATIONS

PCT International Search Report and The Written Opinion of the International Searching Authority dated Feb. 22, 2010—(PCT/US2008/077593).

(Continued)

*Primary Examiner* — Gregory A Wilson
(74) *Attorney, Agent, or Firm* — Cantor Colburn LLP (57) ABSTRACT

A system is described wherein a boiler 10 is integrated with an oxygen producing device 12. Combustion heat generated in the boiler 10 is used to generate steam in the boiler and is also applied to at least one of a sweep gas stream 13 and a feed gas stream 15 to ensure that the sweep gas and feed gas streams 12, 15 are provided at the appropriate temperature to the oxygen producing device 12. Flue gas generated by fuel combustion within the combustion chamber 14 may be used as the sweep gas stream 13, in which case, the flue gas exiting the oxygen producing device 12 includes the oxygen removed from the feed gas stream. The flue gas/oxygen mixture may be used for fuel combustion within the combustion chamber, and may be provided to an oxygen separator 28 for removing oxygen from the flue gas. Sensible heat contained in the oxygen depleted feed gas from the oxygen producing device 12 may be recovered by the feed gas stream 15.

24 Claims, 5 Drawing Sheets

U.S. PATENT DOCUMENTS

| | | |
|---|---|---|
| 6,619,041 B2 | 9/2003 | Marin et al. |
| 6,702,570 B2 * | 3/2004 | Shah et al. .................. 431/11 |
| 6,952,997 B2 | 10/2005 | Shimrony et al. |
| 6,955,051 B2 | 10/2005 | Marin et al. |
| 7,118,612 B2 * | 10/2006 | Shreiber et al. ................ 95/54 |
| 2001/0004516 A1 | 6/2001 | Malaubier et al. |
| 2002/0073844 A1 | 6/2002 | Bool, III et al. |
| 2002/0078906 A1 * | 6/2002 | Prasad et al. .................. 122/40 |
| 2002/0088221 A1 | 7/2002 | Griffin et al. |
| 2003/0056647 A1 | 3/2003 | Gottzmann |

FOREIGN PATENT DOCUMENTS

| | | |
|---|---|---|
| EP | 1040861 | 3/2000 |
| EP | 1172135 A1 | 7/2001 |
| EP | 2026004 A1 | 8/2007 |
| JP | 2006303104 A * | 11/2006 |
| WO | WO 97/07329 | 2/1997 |
| WO | WO 02/053969 | 7/2002 |

OTHER PUBLICATIONS

"OCDO/AEP Retrofit Study" Bozzuto, et al.—2001.

"Greenhouse Gas Emissions control by Firing in Circulating Fluid Beds" vol. II (Nsakala et al.—2003).

Control of Carbon Dioxide Emissions from a Power Plant (and use in enhanced oil recovery); Frederick L. Horn & Meyer Steinberg; Fuel, 1982, vol. 61, May (pp. 415-422).

* cited by examiner

BOILER HAVING AN INTEGRATED OXYGEN PRODUCING DEVICE

TECHNICAL FIELD

The present invention relates to a boiler being integrated with an oxygen producing device, and more specifically to a system in which combustion heat generated in the boiler is used to generate steam in the boiler and is applied to at least one of a sweep gas stream and a feed gas stream to ensure that the sweep gas and feed gas streams are provided to the oxygen producing device at temperatures required by the oxygen producing device.

BACKGROUND

The combustion of fossil fuels with relatively pure oxygen has been considered for a variety of reasons, primarily related to the desire to eliminate or effectively reduce the dilution effects of the nitrogen in air. In the past, interest was in reducing the formation of nitrogen oxides during combustion. More recently, the desire to produce a concentrated stream of carbon dioxide for capture and sequestration in order to reduce greenhouse gas emissions has provided a driving impetus. Large quantities of oxygen are commercially produced via the cryogenic separation of oxygen from nitrogen in air. However, the energy requirements for this process are quite high relative to the combustion process, ranging from about 20% to about 30% of the fuel energy depending upon the oxygen purity required. This energy consumption greatly reduces the output of steam and electricity in power plants (see Bozzuto, et al., 2001, OCDO/AEP retrofit study). New technology developments seek to generate oxygen with lower energy consumption. Economic studies indicate that these approaches could improve plant economics (see "Greenhouse Gas Emissions Control By Oxygen Firing In Circulating Fluid Beds" Vol. II (Nsakala, et al., 2003). Advanced systems for the separation of oxygen from a feed gas stream include, for example, pressure swing systems, physical and chemical adsorption systems, and membrane systems. In such systems, the feed gas stream passes over a sorbent, membrane, or the like, and at least a portion of the oxygen within the feed gas is removed. In many of these systems, a high temperature sweep gas is required to provide a chemical driving force for oxygen separation or to regenerate the sorbent material. In effect, the sweep gas stream "sweeps" the oxygen away from the oxygen producing device (e.g., sorbent, membrane, or the like). To ensure the proper operation of the oxygen producing device, the sweep gas and feed gas streams must be provided to the oxygen producing device at temperatures within specified temperature ranges (see U.S. Pat. No. 6,562,104).

One example of a membrane system is the oxygen transport membrane as discussed in U.S. Pat. No. 6,406,518. In this system, air is heated before passing through a ceramic membrane. On the other side of the membrane, a gas with very low oxygen content is also preheated and passed over the outside of the membrane. The difference in oxygen partial pressure provides a driving force for the separation of oxygen from the air through the membrane. The temperature range is given as 450° C. to 1200° C. In an absorption system, the air is passed over a medium that captures oxygen at one temperature and liberates oxygen at a higher temperature. The driving force for separation may also be provided by air compression as described in U.S. Pat. No. 6,702,570. Alternatively, a material may absorb oxygen at high pressure and release oxygen at a lower pressure, as done in pressure swing systems. The goal of all of these systems is to separate oxygen from air at a lower energy penalty than cryogenic separation.

As a high temperature environment is often required in these systems, it is desired to provide a system that allows the use of these various oxygen generation systems with a boiler system to generate steam (and electricity) with reasonable efficiency, provide a concentrated carbon dioxide stream, and provide a high temperature environment necessary to allow the oxygen separation system to function optimally.

SUMMARY

In one aspect, there is provided a system comprising an oxygen producing device and a boiler. The oxygen producing device removes oxygen from a feed gas stream and provides the removed oxygen to a sweep gas stream. The boiler includes a combustion chamber in which fuel combustion provides heat for generating steam. The boiler also includes at least one air heater in which at least one of the feed gas stream and the sweep gas stream are heated before entering the oxygen producing device. In various embodiments, at least a portion of the oxygen producing device is disposed in the boiler and flue gas generated by fuel combustion within the combustion chamber is used as the sweep gas stream. In these embodiments, the flue gas exiting the oxygen producing device includes the oxygen removed from the feed gas stream. The flue gas/oxygen mixture may be used for fuel combustion within the combustion chamber, and may be provided to an oxygen separator for removing oxygen from the flue gas. Sensible heat contained in the oxygen depleted feed gas is recovered by the feed gas stream by heat exchange from the oxygen depleted gas to the feed gas stream (air).

In another aspect, there is provided a boiler comprising a combustion chamber in which fuel combustion provides heat for generating steam, and at least one air heater is disposed in the boiler proximate the combustion chamber. The at least one air heater is in fluid communication with an oxygen producing device, and at least one of a feed gas stream and a sweep gas stream to the oxygen producing device are heated in the at least one air heater.

In yet another aspect, there is provided a method for heating a feed gas stream and a sweep gas stream for use in an oxygen producing device. The method comprises: combusting fuel in a combustion chamber of a boiler to generate heat, the combustion resulting in a flue gas; heating a feed gas stream using the heat generated by combusting the fuel; providing the feed gas stream to an oxygen producing device to remove oxygen from the feed gas stream; and providing the flue gas as a sweep gas stream to the oxygen producing device to remove the oxygen from the oxygen producing device.

BRIEF DESCRIPTION OF THE DRAWINGS

Referring now to the drawings, wherein like items are numbered alike in the various Figures.

DETAILED DESCRIPTION

FIGS. 1-5 depict various embodiments of a boiler 10 integrated with an oxygen producing device 12. In each of the systems, the combustion heat generated in the boiler 10, which is used to generate steam in the boiler 10, is also applied to at least one of a sweep gas stream 13 and a feed gas stream 15 to ensure that the sweep gas and feed gas streams 12, 15 are provided to the oxygen producing device 12 at temperatures required by the oxygen producing device 12. In each of the examples described in FIGS. 1-4, the feed gas is air, the sweep gas is flue gas, and the oxygen producing device 12 transfers oxygen from the feed gas stream 15 to the sweep gas stream 13. However, it will be noted that the sweep gas is steam generated in the boiler 10 in FIG. 5. It is contemplated, however, that the oxygen producing device 12 may be any device that separates oxygen from a feed gas and employs a sweep gas to provide a chemical driving force for the oxygen separation or to regenerate a sorbent material used in the oxygen separation. For example, the oxygen producing device 12 may be a pressure swing system, adsorption system, membrane system, or the like.

Figure 1:
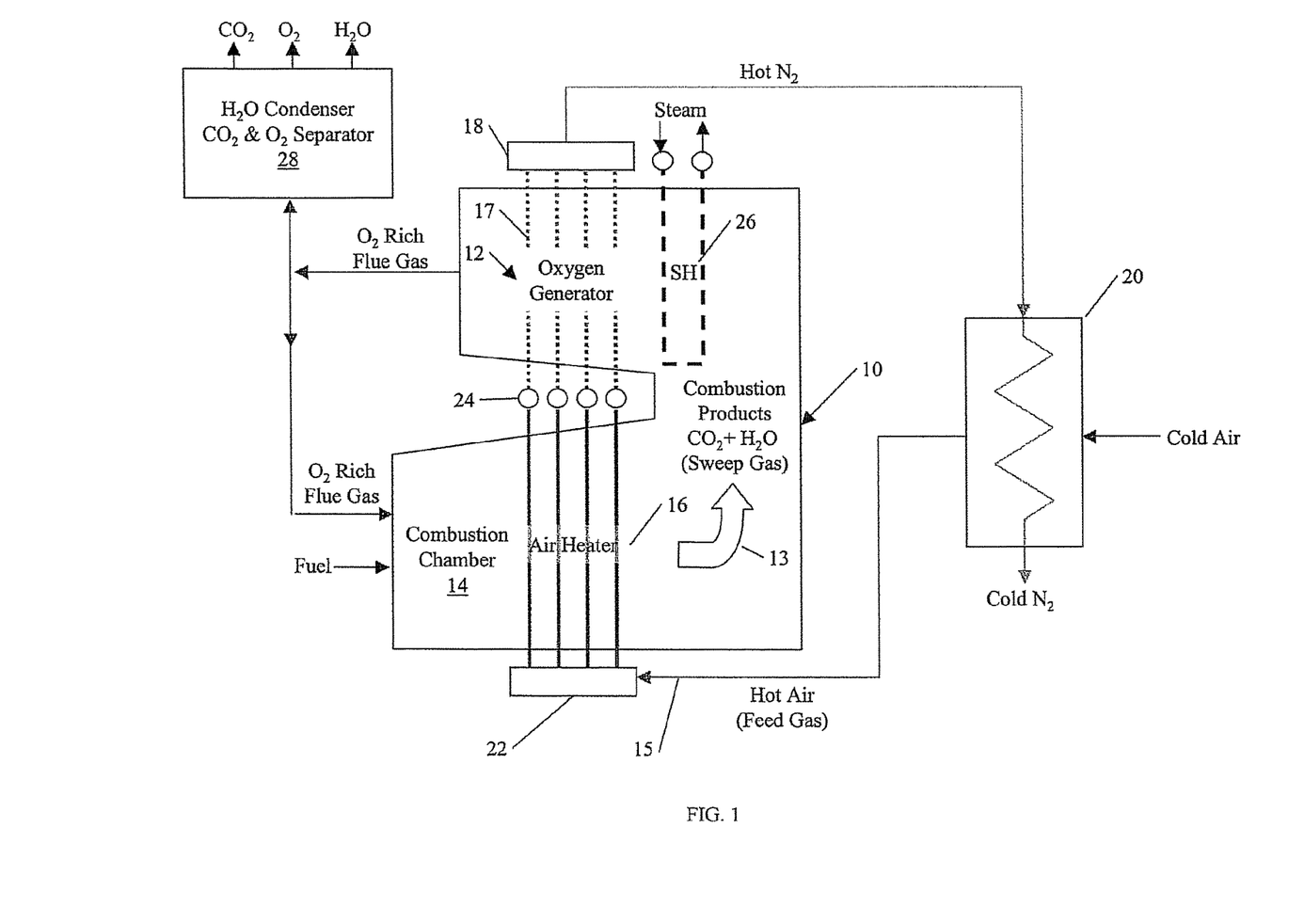
FIG. 1 is a schematic depiction of a first embodiment of a boiler integrated with an oxygen producing device.

In a first embodiment, shown in FIG. 1, a boiler 10 is integrated with an oxygen producing device 12. In the boiler 10, recycled flue gas enriched with $O_2$ replaces combustion air and is premixed with fuel for firing in a combustion chamber 14 of the boiler 10. Heat of combustion is transferred to the waterwalls of the boiler 10 to generate steam and to preheat a feed gas (air) stream 15 flowing through a high temperature air heater 16.

In the air heater 16, the feed gas stream 15 is heated to a temperature required by operating characteristics of the oxygen producing device 12. In the embodiment shown, the oxygen producing device 12 is an oxygen transport membrane 17 that selectively passes oxygen ions through the membrane 17 without allowing the other gaseous components to pass through the membrane 17. Thus, the gas exiting the transport membrane 17 is hot, $O_2$ depleted air, which is essentially pure $N_2$. This $N_2$ gas is collected from the oxygen producing device 12 at an exhaust header 18 located external to the boiler 10, and the $N_2$ gas is fed to a low temperature air heater 20 where heat contained in the $N_2$ stream is recovered. A heat recovery steam generator (HRSG) or any other cooling system could be used to replace the low temperature air heater 20.

The feed gas stream 15 is preheated in the low temperature air heater 20 and is piped to an inlet header 22 of the high temperature air heater 16. From the high temperature air heater 16, the feed gas stream 15 flows to the oxygen producing device 12. Connections between high temperature air heater 16 and the oxygen producing device 12 are made outside the boiler 10 by a system of connectors 24.

In the boiler 10, at least a portion of the oxygen producing device 12 (e.g., the transport membrane 17) is positioned in the path of the flue gas, and the flue gas acts as the sweep gas stream 13 for the oxygen producing device 12. The products of combustion consist essentially of a mixture of water vapor ($H_2O$) and carbon dioxide ($CO_2$), and are well suited for sweeping $O_2$ from the oxygen producing device 12. The flue gas may be further cooled by convective heat transfer sections 26 to maintain the temperature of the sweep gas stream 13 to within the temperature requirements of the oxygen producing device 12.

In the embodiment shown, the flue gas flows over the membrane 17 elements sweeping away the $O_2$ that is transferred across the membrane 17. The flue gas, now rich in oxygen, contains the same weight percent $O_2$ as in the ambient air. The $O_2$ rich flue gas may be cooled further before exiting the boiler 10. Upon exiting the boiler 10, the flue gas is split into two streams: one stream is used for combustion, and the other stream is diverted to a water vapor condenser and $CO_2$ and $O_2$ separation systems 28, where the gases contained in the flue gas are separated, cleaned and prepared for commercial use.

Figure 2:
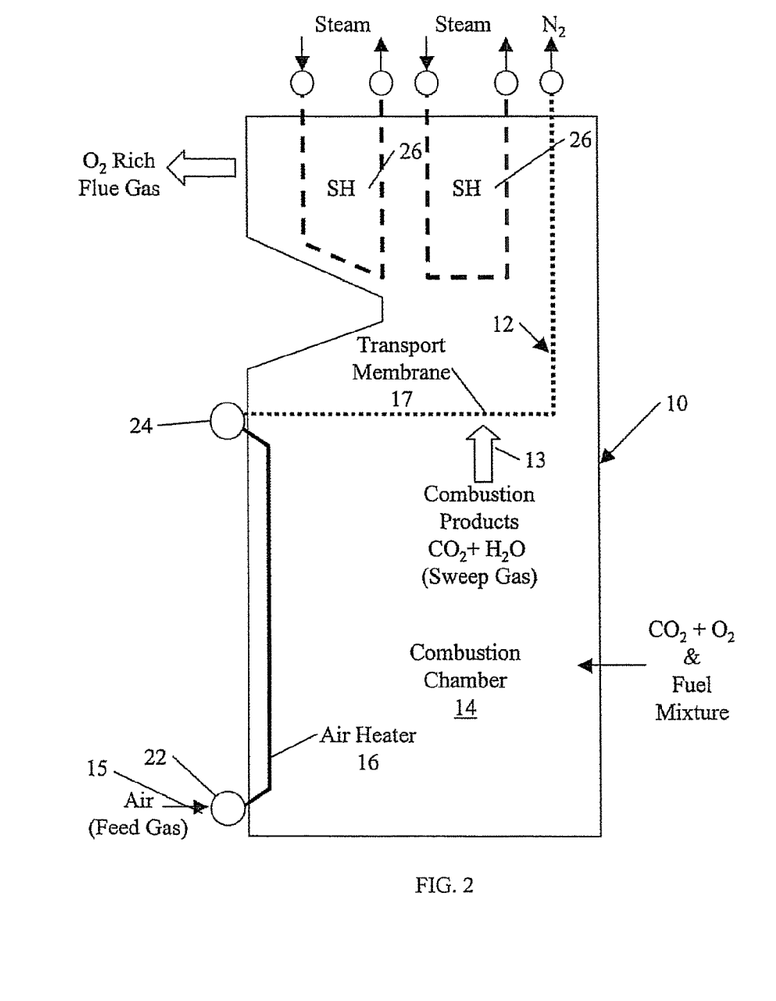
FIG. 2 is a schematic depiction of a second embodiment of a boiler integrated with an oxygen producing device, wherein the oxygen producing device is located proximate the combustion chamber.

Referring to FIG. 2, the high temperature air heater 16 may be installed in the lower furnace zone of the boiler 10, and the oxygen producing device 12 may be installed in the upper furnace zone of the boiler 10. Connection between the oxygen producing device 12 and the high temperature air heater 16 is facilitated outside the boiler 10. Where the oxygen producing device 12 employs a transport membrane 17, the transport membrane 17 may be situated close to, or within, the combustion chamber 14 to increase the temperature of the sweep gas stream 13 at the transport membrane 17.

Figure 3:
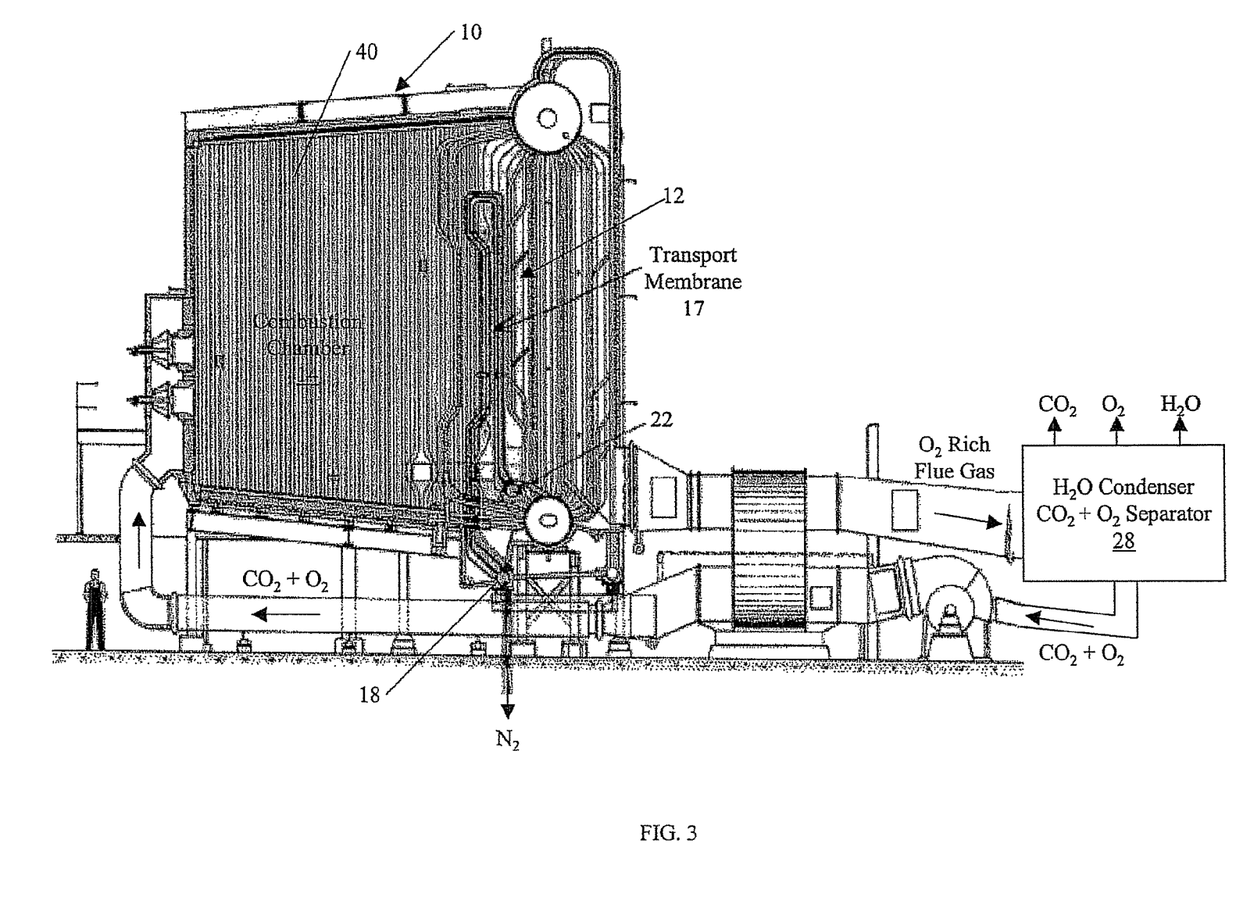
FIG. 3 is a cross-sectional elevation view of a third embodiment of a boiler integrated with an oxygen producing device, wherein the oxygen producing device is located in a wall of the boiler.

FIG. 3 depicts an embodiment where the boiler 10 is a package boiler. The embodiment of FIG. 3 is similar to that of FIG. 2 except for the location of the oxygen producing device 12, which is shown in FIG. 3 to include a transport membrane 17 and air inlet header 22. In FIG. 3, a high temperature air heater (not shown) may be installed inside the boiler 10 along with the oxygen producing device 12. The oxygen producing device 12 and/or the high temperature air heater may be incorporated into a wall 40 defining the combustion chamber 14 of the boiler 10 in such a way that the oxygen producing device 12 and/or the high temperature air heater is removable from the rest of the boiler 10 along with the wall 40 (e.g., through the use of a flanged wall 40).

Figure 4:
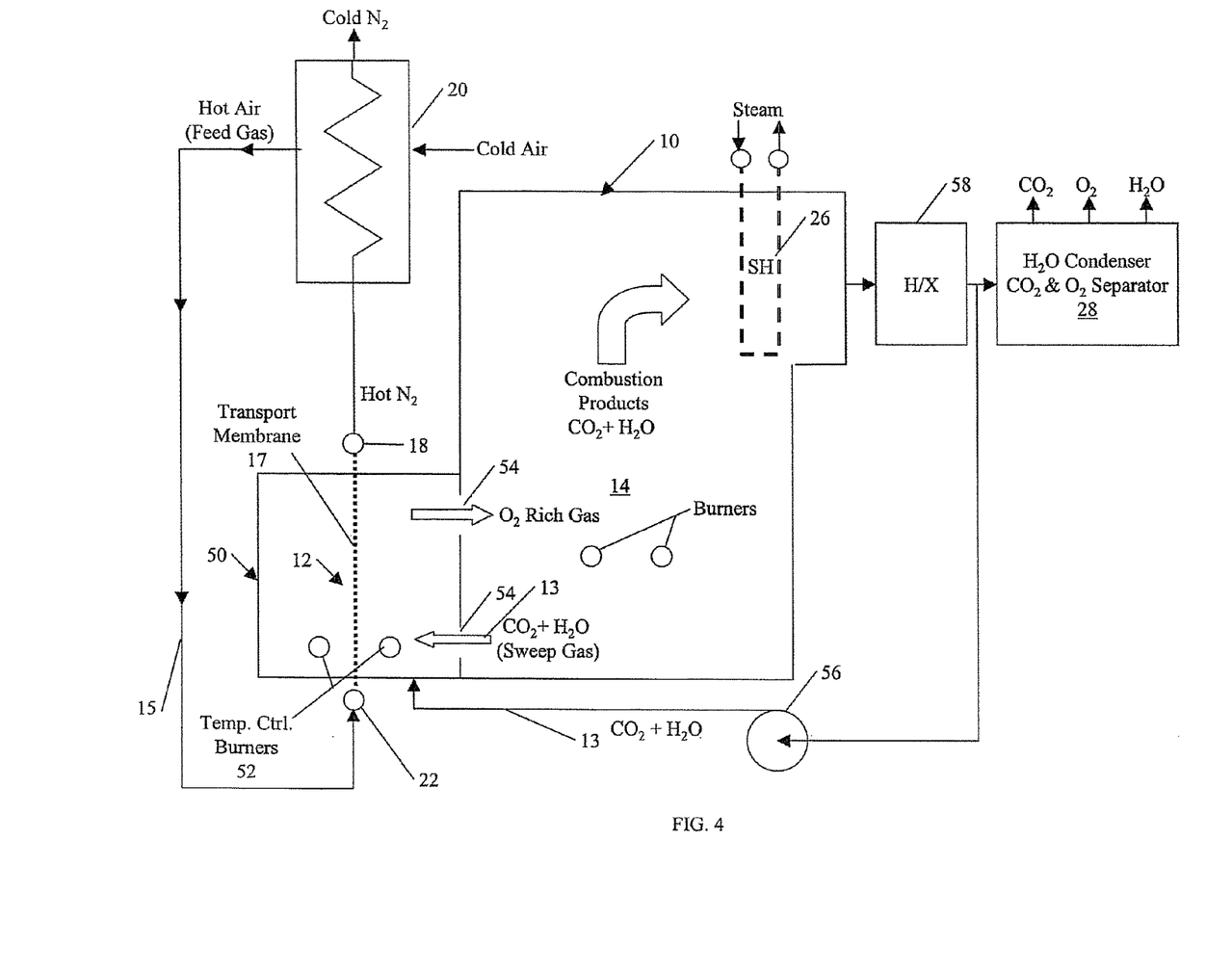
FIG. 4 is a schematic depiction of a fourth embodiment of a boiler integrated with an oxygen producing device, wherein the oxygen producing device is located inside a chamber forming an integral part of the boiler.

Referring to FIG. 4, an embodiment is shown wherein the oxygen producing device 12 (e.g., a transport membrane 17) is installed inside a boiler chamber 50 forming an integral part of the larger boiler 10. Within the chamber 50, small temperature control burners 52 are installed around the oxygen producing device 12 to ensure that the system 12 is maintained at a desired temperature during start-up and operation, and to protect the system 12 against potential thermal shock caused by the flow of the sweep gas stream 13 over the membrane 17.

The sweep gas stream 13 may be provided by internally-induced recirculation via ports 54 installed in the waterwalls of the boiler 10, by external recirculation of flue gas by a gas recirculation fan 56, or by both. The sweep gas stream 13 consists essentially of either $CO_2$ or a mixture of $CO_2$ plus $H_2O$. $O_2$ contained in the sweep gas stream 13 is consumed in the combustion within the combustion chamber 14 of the main boiler 10, producing flue gas high in $CO_2$ and $H_2O$ concentration. The flue gas may be cooled in a series of heat exchangers 26, 58.

Hot $O_2$ depleted air, which is essentially pure $N_2$ is collected from the oxygen producing device 12 and piped to an air heater 20 where sensible heat contained in the $N_2$ stream is recovered by the feed gas stream 15. An HRSG or any other cooling system could be used to replace the air heater 20.

Figure 5:
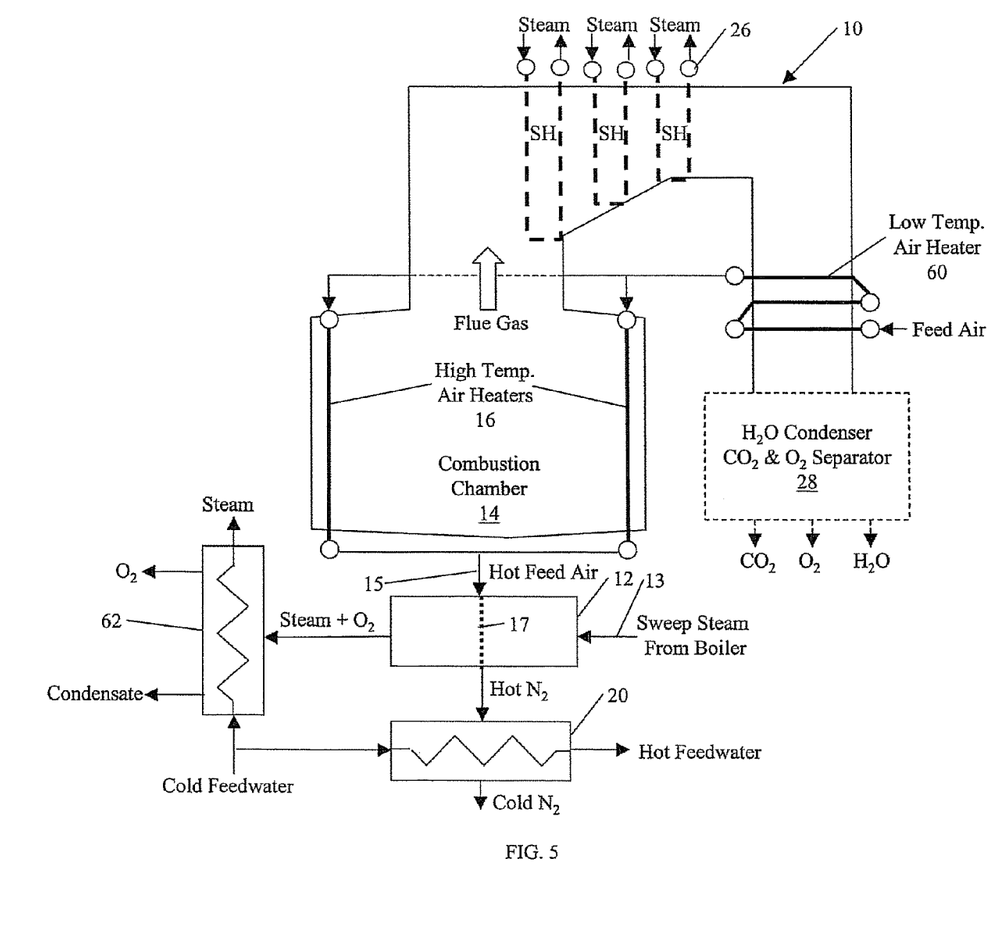
FIG. 5 is a schematic depiction of a fifth embodiment of a boiler integrated with an oxygen producing device, wherein the oxygen producing device is located outside the boiler.

FIG. 5 depicts an embodiment wherein the oxygen producing device 12 is positioned outside the boiler 10. Fuel fired with air (or a flue gas/$O_2$ mixture) in the boiler 10 transfers heat to generate steam and to preheat air, which are transported to the oxygen producing device 12 as the sweep gas stream 13 and feed gas stream 15, respectively.

High temperature feed gas stream 15 is provided by an air heater system including a convective (low temperature) section 60 and a radiant (high temperature) section 16 installed inside the boiler 10. Hot $O_2$ depleted air, which is essentially pure $N_2$ is collected from the oxygen producing device 12 and is piped to an HRSG or an air heater 20 where sensible heat contained in the $N_2$ stream is recovered.

Steam generated by the boiler 10 is used as the sweep gas stream 13 to sweep $O_2$ from the oxygen producing device 12. The sweep gas stream 13 is provided at the temperature required to maintain the membrane 17 at operating conditions and to prevent thermal shock of the membrane 17. The sweep steam with $O_2$ is transported from the oxygen producing device 12 to an $HRSG/H_2O$ condenser system 62 where the steam/$O_2$ mixture is cooled, water vapor is condensed and $O_2$ separated. The separated $O_2$ could be used for combustion in boiler 10 or in another industrial application.

If the $CO_2/H_2O/O_2$ mixture from the oxygen producing device 12 is used for combustion in the boiler 10 instead of combustion air, flue gas leaving the boiler 10 may be treated in a water vapor condenser and $CO_2$ separation system 28. Alternatively, if combustion air is used, flue gas leaving the boiler 10 is emitted to the atmosphere through the stack.

Since the invention is susceptible to various modifications and alternative forms, it should be understood that the invention is not intended to be limited to the particular forms disclosed. Rather, the scope of the invention extends to all modifications, equivalents and alternatives falling within the spirit and scope of the invention as defined by the appended claims.

What is claimed is:

1. A system comprising:
   an oxygen producing device that removes oxygen from a feed gas stream and provides the removed oxygen to a sweep gas stream; and
   a boiler including:
      a combustion chamber in which fuel combustion generates flue gas and provides heat for generating steam and heating at least one of the feed gas stream and the sweep gas stream, and
      at least one air heater disposed proximate the combustion chamber and in fluid communication with the oxygen producing device, wherein the feed gas stream is heated in the at least one air heater before entering the oxygen producing device,
   wherein the oxygen producing device comprises an oxygen transport membrane disposed in the boiler.

2. The system of claim 1, wherein the flue gas generated by fuel combustion within the combustion chamber is used as the sweep gas stream.

3. The system of claim 2, wherein the flue gas exiting the oxygen producing device includes the oxygen removed from the feed gas stream, and fuel combustion within the combustion chamber is conducted using at least some of the flue gas exiting the oxygen producing device.

4. The system of claim 3, wherein some of the flue gas exiting the oxygen producing device is provided to an oxygen separator for removing oxygen from the flue gas.

5. The system of claim 2, wherein the flue gas exiting the oxygen producing device includes the oxygen removed from the feed gas stream, and wherein at least some of the flue gas exiting the oxygen producing device is provided to an oxygen separator for removing oxygen from the flue gas.

6. The system of claim 2, wherein the flue gas is cooled by a convective heat transfer section within the boiler before the flue gas enters the oxygen producing device.

7. The system of claim 1, wherein the oxygen producing device is installed inside a chamber forming an integral part of the boiler, and, within the chamber, temperature control burners are installed around the oxygen producing device to maintain the oxygen producing device at a desired temperature.

8. The system of claim 1, wherein the at least one air heater includes a radiant heat transfer section disposed proximate the combustion chamber and a convective heat transfer section distal from the combustion chamber.

9. The system of claim 1, wherein the at least one air heater is disposed in a wall of the boiler.

10. The system of claim 9, wherein the wall is flanged to facilitate removal of the wall and the at least one heater from the boiler.

11. The system of claim 1, wherein sensible heat contained in the feed gas stream depleted of oxygen from the oxygen producing device is recovered by the feed gas stream.

12. The system of claim 1, wherein the steam is used as the sweep gas stream.

13. A boiler comprising:
   a combustion chamber in which fuel combustion generates flue gas and provides heat for generating steam and heating at least one of a feed gas stream and a sweep gas stream; and
   at least one air heater disposed proximate the combustion chamber, the at least one air heater being in fluid communication with an oxygen producing device,
   wherein the feed gas stream to the oxygen producing device is heated in the at least one air heater, and
   wherein the oxygen producing device include an oxygen transport membrane disposed within the combustion chamber.

14. The boiler of claim 13, wherein the flue gas generated by the combustion of fuel within the combustion chamber is used as the sweep gas stream.

15. The boiler of claim 14, wherein the flue gas exiting the oxygen producing device includes the oxygen removed from the feed gas stream, and fuel combustion within the combustion chamber is conducted using at least some of the flue gas exiting the oxygen producing device.

16. The boiler of claim 14, wherein some of the flue gas exiting the oxygen producing device is provided to an oxygen separator for removing oxygen from the flue gas.

17. The boiler of claim 13, wherein the flue gas exiting the oxygen producing device includes the oxygen removed from the feed gas stream, and wherein some of the flue gas exiting the oxygen producing device is provided to an oxygen separator for removing oxygen from the flue gas.

18. The boiler of claim 13, wherein the at least one air heater is disposed in a wall of the combustion chamber.

19. The boiler of claim 18, wherein the wall is flanged to facilitate removal of the wall and the at least one heater from the combustion chamber.

20. A method for providing a feed gas stream and a sweep gas stream to an oxygen producing device, the method comprising:
   combusting fuel in a combustion chamber of a boiler to generate heat, the combustion resulting in a flue gas;
   heating at least one of a feed gas stream and a sweep gas stream using the heat generated by combusting the fuel;
   providing the feed gas stream to an oxygen producing device to remove oxygen from the feed gas stream; and
   providing the sweep gas stream to the oxygen producing device to remove the oxygen from the oxygen producing device.

21. The method of claim 20, wherein the flue gas is the sweep gas stream and the providing the sweep gas stream to the oxygen producing device results in a mixture of the flue gas and the oxygen generated by the oxygen producing device; and the fuel combustion in the combustion chamber is performed using the mixture of the flue gas and the oxygen generated by the oxygen producing device.

22. The method of claim 20, further comprising:

cooling the flue gas within the boiler before providing the flue gas as the sweep gas stream to the oxygen producing device.

23. The method of claim 20, further comprising:

recovering sensible heat contained in the oxygen depleted feed gas stream for use in heating the feed gas stream.

24. The method of claim 20, further comprising:

providing steam generated in the boiler as the sweep gas stream.

* * * * *